Figure 1:
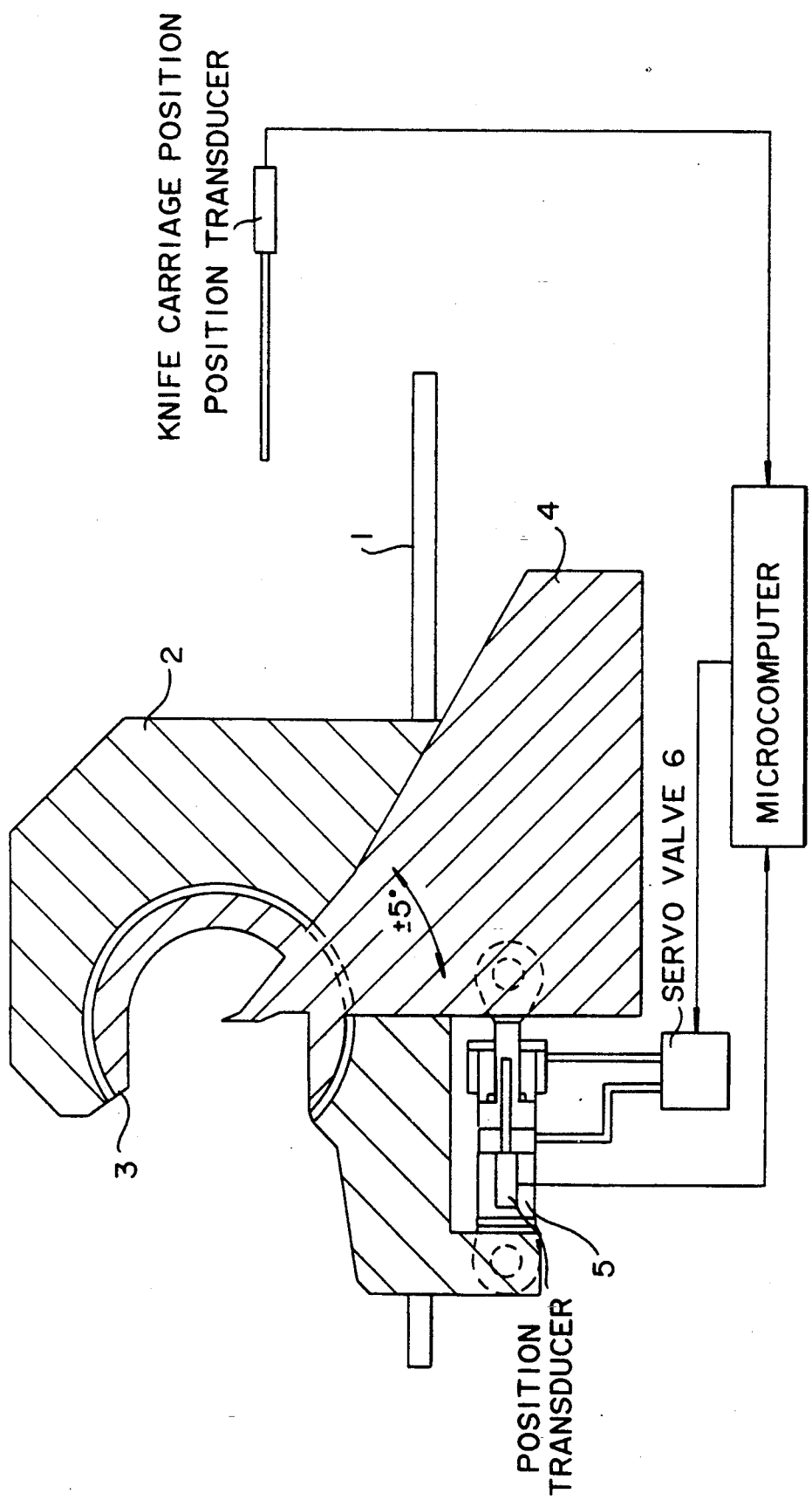

United States Patent [19]

Toivio

[11] Patent Number: 5,143,129
[45] Date of Patent: Sep. 1, 1992

[54] APPARATUS FOR ADJUSTING THE PITCH ANGLE OF A KNIFE BLADE IN A VENEER LATHE

[75] Inventor: Juha Toivio, Lahti, Finland

[73] Assignee: Raute Oy of Vesijarvenkatu, Lahti, Finland

[21] Appl. No.: 727,684

[22] Filed: Jul. 10, 1991

Related U.S. Application Data

[63] Continuation-in-part of Ser. No. 581,846, Sep. 13, 1990.

[30] Foreign Application Priority Data

Sep. 18, 1989 [FI] Finland .................................. 894389

[51] Int. Cl.$^5$ ............................. B27L 5/00; B27B 1/00
[52] U.S. Cl. .................................. 144/211; 144/209 R; 144/357; 144/365; 364/474.02
[58] Field of Search ...................... 364/474.01, 474.02, 364/474.17; 144/209 R, 211, 212, 213, 356, 357, 365

[56] References Cited

U.S. PATENT DOCUMENTS 4,708,180 11/1987 Browning, Jr. et al. ........... 144/357

Primary Examiner—W. Donald Bray
Attorney, Agent, or Firm—Armstrong, Nikaido, Marmelstein, Kubovcik & Murray

[57] ABSTRACT

A veneer lathe including a knife blade which is adjustable to different pitch angles. The veneer lathe includes a feed carriage mounted for movement on guides fixed to a lathe frame and a blade carriage supporting the knife blade. The blade carriage is a massive member pivotally mounted by trunnions on the feed carriage so as to rotate under the force of gravity. A support device is operative between the feed carriage and the blade carriage for supporting the blade carriage against the force of gravity in an angularly biased position relative to the feed carriage. The lathe also includes a control responsive to different types of wood for allowing the means for supporting the blade carriage to retract at different rates under the force of gravity exerted on the blade carriage.

3 Claims, 3 Drawing Sheets

APPARATUS FOR ADJUSTING THE PITCH ANGLE OF A KNIFE BLADE IN A VENEER LATHE

This application is a continuation-in-part of application Ser. No. 581,846, filed on Sept. 13, 1990.

The present invention relates to an apparatus for adjusting the knife blade angle in a veneer lathe during the lathe operation.

More specifically, the present invention is directed to a veneer lathe of the type which includes: a means to clamp a log to be peeled at its ends, a means to force the log to rotate in a given direction when clamped by the clamping means, a cutting blade to peel a veneer from the surface of the rotating log, a massive blade carriage to firmly hold the blade, and a feed carriage supporting the blade carriage and controllably pushing it and the blade towards the log to be peeled.

During the peeling process, the radius of the block gets smaller in accordance with the progress of the peeling, and consequently, the position of the cutting blade relative to the log changes. This results in a change in the blade pitch angle relative to the block. A correct pitch angle is, however, very critical to the peeling result, at least as far as the veneer quality is concerned. In order to maintain the correct pitch angle, i.e., the most efficient cutting angle during the whole operation cycle, the tilting position of the cutting blade relative to the log must be changed during the peeling process. The change is effected by controllably tilting the cutting blade around an axis defined by the cutting edge of the blade.

To make this tilting movement possible, the blade carrier that supports the blade carriage is mounted on the feed carriage by means of trunnions resting on upright trunnion supports forming a part of the feed carriage. Then, as the feed carriage advances in accordance with the feed along horizontal guides attached to the lathe frame, the tilting position of the blade carriage is controllably turned in dependence on the advancing movement of the feed carriage. The control of the turning of the blade carriage in accordance with the advancing movement of the main feed carriage can be arranged in different modes. A common feature is to arrange the projecting tail end of the massive blade carriage to rest on a guide sloping in a narrow angle towards the feeding direction of the feed carriage. The guide allows the blade carriage to lower its tail end under the force of gravity, whereby the tilting position of the blade carriage, supported by the trunnions, changes and consequently, also the pitch angle.

In the traditional mode of the aforesaid blade carriage tilting control the guide rail is linear. This linear guide, however, adjusts the pitch angle only approximately. In order to get more accurate pitch angle control, curved guide surfaces have been used to adjust the blade carriage tilting position, as described for instance in U.S. Pat. No. 4,708,180. It is possible to design these guide surfaces to suit selected species of wood. However, this design applies in principle only for wood in certain condition.

If the structure or the condition of the wood varies from the parameters on which the guide curvature calculations are based, the pitch angle adjustment cannot be performed in the most accurate manner and it negatively effects the veneer quality. Furthermore, the changes in the surface and the sap wood portions of a block lead to an uneven quality of the product. The lack of adjusting possibilities in the traditional control of the aforesaid kind is emphasized when the wood is changed from one species to another.

In order to overcome the limitation involved in the pitch angle adjusting devices referred to above, there have been suggestions to insert an adjusting device between the projecting tail end of the blade carriage and the guide supporting this projecting end of the blade carriage. One embodiment using this principle is described in U.S. Pat. No. 4,979,120. The pitch angle adjusting device described in this specification involves a cam device acting as an intermediate support between the projecting tail end of the blade carriage and the guide. The cam device is adjustable by means of a control device receiving its commands from a computing unit. It is essential that the said apparatus uses a guide rail and an adjusting cam device.

As improved embodiment of this pitch angle adjusting principle is disclosed in the U.S. Pat. No. 4,494,588. The veneer lathe described in this specification comprises a feed carriage - blade carriage combination, where the massive blade carriage resting turnable on trunnions, abuts by means of an adjustable cam means its projecting tail end directly against the feed carriage. The cam means receives a computed control signal to lower the tail end in accordance with the advance movement of the feed carriage. It is essential that this apparatus also includes a traditional cam device to determine the tilting position of the blade carriage.

The sector in which the pitch angle is to be changed is, however narrow, usually within ±5°, therefore, the device used for the adjustment must be accurate, and also able to support an essential part of the mass of the blade carriage. A cam device used traditionally for this purpose is well suited to carry heavy loads, but its ability to be adjusted does not fulfill the accuracy requirement. By means of a cam device, it is namely not possible to convert rotation movement directly to linear movement, and consequently, the adjusting device controlling the cam device must be complicated in order to accomplish a moderate operation.

The pitch angle controlling device according to the invention uses the basic principle described above, according to which a massive blade carriage, hanging in a biased position on trunnions, is by means of a position adjusting device abutted against the feed carriage of the lathe. The adjusting device is inserted between the blade carriage and the feed carriage to determine the tilting position of the hanging blade carriage relative to the main feed carriage. As the adjusting means, the invention uses a hydraulic or pneumatic cylinder piston device, or a screw jack. The said actuating devices are connected to a control means to determine the actual effective length of the actuating means, and consequently, the actual angular tilting position of the blade carriage relative to the feed carriage. In the cylinder piston device, the control means is a controlled valve, and in the screw jack a controlled drive motor.

Figure 2:
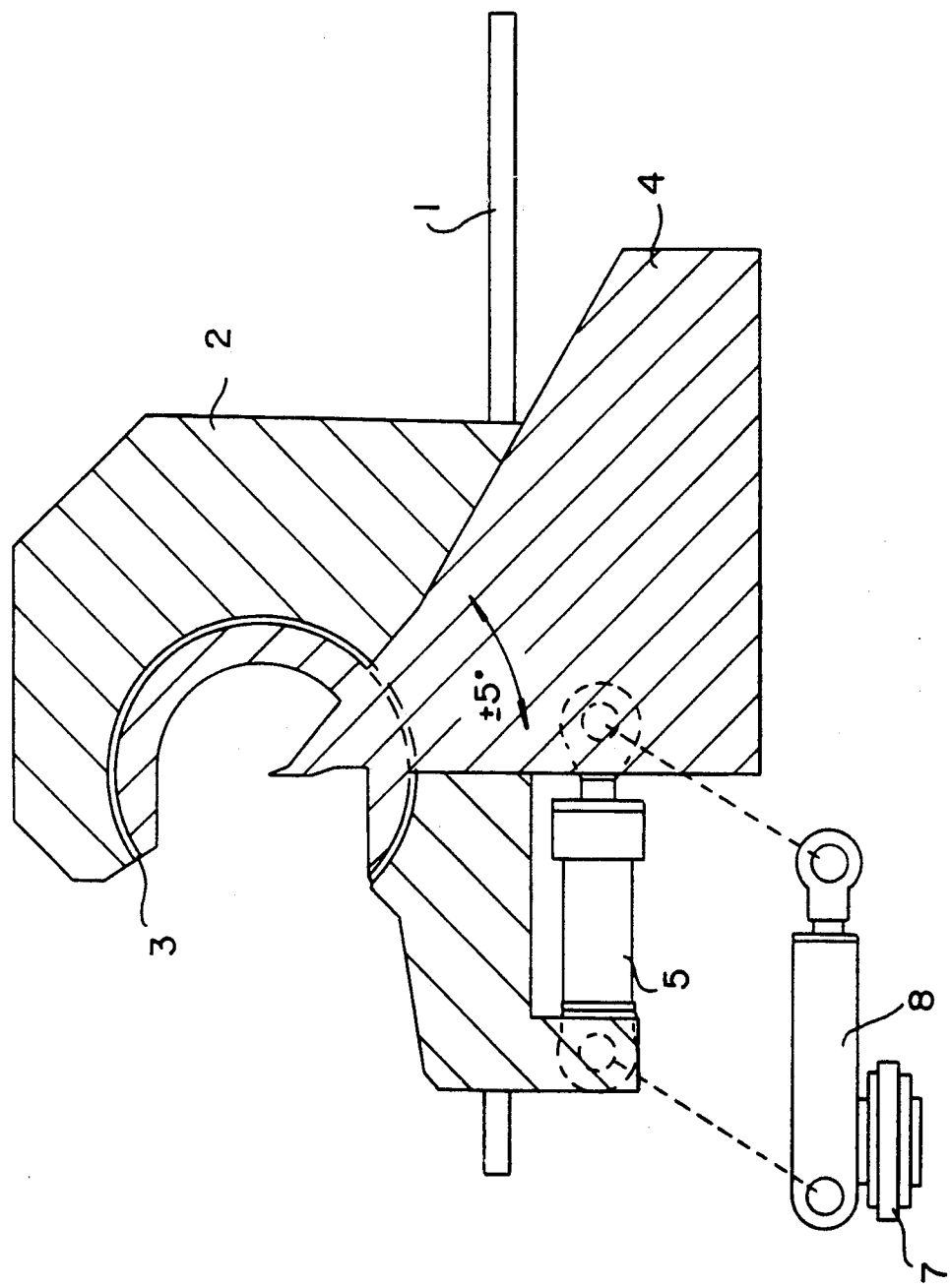
Figure 3:
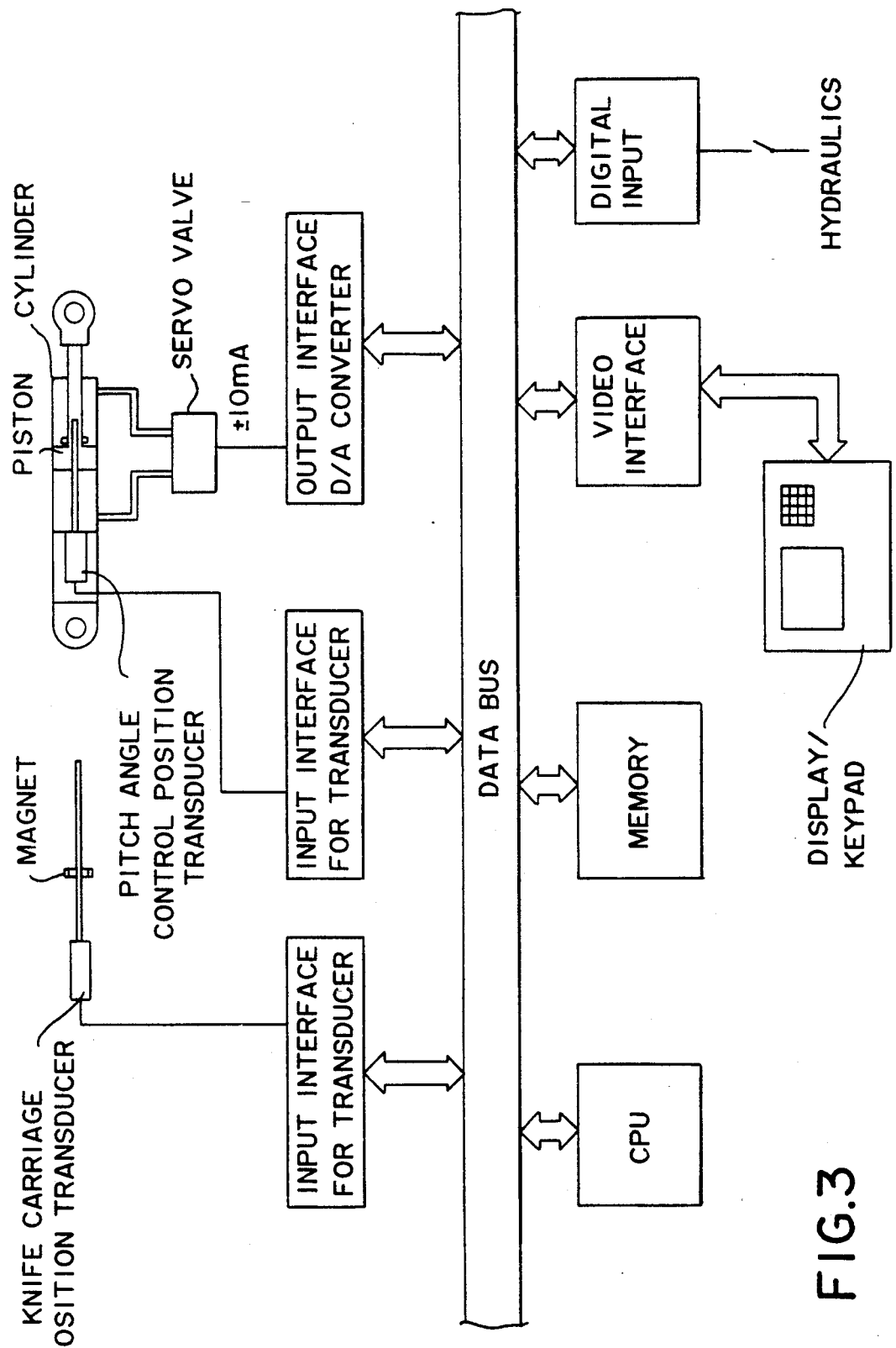

The invention is described more precisely with reference to the accompanying drawings in which FIG. 1 is a schematic view of the adjusting device according to the invention;

FIG. 2 shows an alternate actuating device for the adjusting system according to FIG. 1; and FIG. 3 shows a control system for the adjusting device of FIG. 1.

The apparatus supporting the cutting blade consists of a feed carriage (2), which advances in accordance with the cutting blade feed along horizontal guides (1) fixed to the lathe frame.

The feed carriage supports a massive blade carriage device 4 to which the cutting blade is fastened. The blade carriage is hanging on two trunnion constructions 3, one at each end of the blade carriage. The blade carriage 4 includes a projecting tail end, the mass of which is used to apply or take advantage of the force of gravity to urge or cause the blade carriage to turn on the trunnions in one direction. This turning is resisted by an actuating device 5 inserted between the blade carriage and the feed carriage. The said actuating device, shown in FIG. 1 as a cylinder piston device, is arranged to controllably retract under the pushing action exerted by the gravity biased hanging blade carriage. The pressure in the cylinder is lowered by a control valve 6, defined as a servo valve in the drawing. The said control valve 6 receives its control signal from a computing unit, which determines an actual control signal for the valve in accordance with the actual positions of the feed carriage and the piston rod, of which the position of the piston rod is directly proportional to the pitch angle to be adjusted.

According to the embodiment of FIG. 2, the actuating device 5 of FIG. 1 can be also a screw jack schematically illustrated as a device 8 in the drawing. Instead of a control valve, the screw jack involves a motor unit 7 to adjust the length of the projecting screw in the same manner as the cylinder piston unit 5 is adjusted by regulating the pressure prevailing in the cylinder chamber.

A control unit which can be used in the arrangement of the pitch angle adjusting device according to the invention is schematically illustrated in FIG. 3.

In a more simplified embodiment of the invention, the control of the cylinder piston device can be obtained by transmitting the control signal to the hydraulic or pneumatic circuit from a sensor that follows the surface of a guide disk. The guide disks can be simple and lightweight by construction and there can be several of them to suit the desired lathe operation.

I claim:

1. Apparatus for adjusting the pitch angle of a knife blade in a veneer lathe comprising:

a feed carriage mounted for movement on guides fixed to a lathe frame, a blade carriage supporting the knife blade, said blade carriage comprising a massive member pivotally mounted by trunnions on the feed carriage so as to rotate under the force of gravity, means operative between the feed carriage and the blade carriage for supporting the blade carriage against the force of gravity in an angularly biased position relative to the feed carriage, and control means responsive to different types of wood for allowing the means for supporting the blade carriage to retract at different rates under the force of gravity exerted on the blade carriage.

2. The apparatus defined by claim 1, wherein said means for supporting the blade carriage is a cylinder having a piston movable therein in response to said control means.

3. The apparatus defined by claim 1, wherein said means for supporting the blade carriage is a screw-jack and including means for turning said screw-jack in response to said control means.

* * * * *